United States Patent [19]

Kalnin et al.

[11] 3,969,430

[45] July 13, 1976

[54] PROCESSABILITY OF INTRACTABLE POLYMERS

[75] Inventors: Ilmar L. Kalnin, Millington, N.J.; Thaddeus E. Helminiak, Dayton, Ohio

[73] Assignee: Celanese Corporation, New York, N.Y.

[22] Filed: Nov. 18, 1974

[21] Appl. No.: 524,750

[52] U.S. Cl. .............................. 260/823; 260/857 R; 260/895
[51] Int. Cl.$^2$ ................... C08L 79/06; C08L 79/04; C08L 79/00
[58] Field of Search ............................ 260/823, 857

[56] References Cited
UNITED STATES PATENTS

| | | | |
|---|---|---|---|
| 3,574,170 | 4/1971 | Chenevey | 260/78 TF |
| 3,584,073 | 6/1971 | Vincent et al. | 260/823 |
| 3,600,341 | 8/1971 | Schmidt et al. | 260/823 |

Primary Examiner—Wilbert J. Briggs, Sr.

[57] ABSTRACT

Normally intractable high temperature resistant polymers which lack plastic flow characteristics, such as polymers of the BBB type [i.e., poly(bisbenzimidazobenzophenanthroline) and related nitrogenous polymers], are rendered capable of undergoing facile molding to form three-dimensional shaped articles. A minor proportion of a cross-linkable additive polymer exhibiting a recognizable glass transition temperature below its decomposition temperature (e.g., a polybenzimidazole) or precursors capable of forming the same is incorporated in substantially uniform physical admixture with the normally intractable polymer, the admixture shaped to form a three-dimensional article, and the resulting article is heated until the additive polymer is cross-linked and the thermal stability of the article is enhanced.

20 Claims, No Drawings

3,969,430

PROCESSABILITY OF INTRACTABLE POLYMERS

BACKGROUND OF THE INVENTION

In recent years considerable attention has been focused upon the development of polymers having high temperature resistance. While considerable success has been achieved in the synthesis of such polymers, it has been found that these polymers commonly are intractable and lack plastic flow characteristics normally encountered in polymers which lack the high temperature resistance. Representative intractable polymers which lack a glass transition temperature below the decomposition temperature include the BBB type polymers [i.e. poly(bisbenzimidazobenzophenantroline) and related nitrogenous polymers]. Fibers and films routinely may be solution spun or cast from such high temperature resistant polymers. However, the intractable nature of such polymers has made the formation of quality three-dimensional shaped articles from the same difficult. For instance, when solid particles of an intractable polymer are hot pressed, good compaction commonly is achieved, but the resulting article commonly exhibits minimal particle bonding thereby limiting its utilization to those applications where high strength demands are not encountered.

It is an object of the present invention to improve the processability of normally intractable high temperature polymers.

It is an object of the present invention to improve the processability of an intractable high temperature polymer which lacks a glass transition temperature below its decomposition temperature.

It is an object of the present invention to provide an improved process for forming a three-dimensional shaped article from a normally intractable high temperature polymer.

It is another object of the present invention to provide improved three-dimensional shaped articles comprising a normally intractable high temperature polymer.

It is a further object of the present invention to improve the strength of three-dimensional articles formed from a hot pressed normally intractable high temperature polymer.

These and other objects as well as the scope, nature, and utilization of the claimed invention will be apparent from the following description and appended claims.

SUMMARY OF THE INVENTION

It has been found that an improved process for forming a three-dimensional shaped article from a normally intractable high temperature resistant polymer comprises:

a. physically admixing in substantially uniform admixture (1) a major quantity of an intractable high temperature resistant polymer which lacks a glass transition temperature below its decomposition temperature and (2) a minor quantity of a cross-linkable additive polymer exhibiting a glass transition temperature below its decomposition temperature, or precursors capable of forming the same, b. forming the substantially uniform admixture into a three-dimensional shaped article at a temperature which is below the decomposition temperature of the intractable high temperature resistant polymer, and below the decomposition temperature of the cross-linkable additive polymer, and c. heating the resulting shaped article until the cross-linkable additive polymer is cross-linked and the thermal stability of the shaped article enhanced.

The present invention in a preferred embodiment provides a high temperature resistant pressure molded three-dimensional shaped article comprising in substantially uniform admixture (1) about 70 to 95 parts by weight of an intractable high temperature resistant BBB type polymer, and (2) about 5 to 30 parts by weight of a cross-linked additive polymer selected from the group consisting essentially of polybenzimidazoles, polyquinoxalines, polybenzothiazoles, polybenzoxazoles, polyoxadiazoles, and mixtures thereof.

DESCRIPTION OF PREFERRED EMBODIMENTS

The Intractable High Temperature Polymer

The present process is suitable for use with those high temperature polymers which are considered to be intractable and which lack plastic flow characteristics exhibited by thermoplastic polymers and partially cured thermosetting polymers. The intractable high temperature polymers commonly exhibit a thermal decomposition point of at least 450°C. (preferably at least 550°C.) in an inert atmosphere (e.g. nitrogen), and lack a glass transition temperature (Tg) below the thermal decomposition temperature. As is recognized by those skilled in polymer technology the glass transition temperature is the temperature at which the structure of a wholly or partially amorphous polymeric material changes from a vitreous state to a viscoplastic state. The glass transition temperature of a given polymer sample conveniently may be determined utilizing conventional thermoanalytical techniques. For instance, when a shaped polymer test specimen is subjected to continuous measurement of its thermal expansion (or contraction) by progressively increasing (or decreasing) the temperature, it commonly is seen that a significant increase (or decrease) in the specimen length takes place suddenly at a given temperature, i.e. at the so-called glass transition temperature or point. This measurement is commonly termed thermomechanical analysis and may be carried out with commercially available instruments. For instance, a Thermomechanical Analyzer, Model No. 990, manufactured by DuPont, was used for the glass transition temperature measurements referred to in the present application.

On the other hand, when an intractable polymer is subjected to such thermomechanical analysis, the thermal expansivity of the test specimen may increase (or decrease) monotonically with changing specimen temperature, but no sudden change in terminal expansivity will be seen.

Likewise, a sudden change in the elastic compliance with temperature can be used to identify the presence of a glass transition temperature, since above that temperature the compliance will be substantially higher than below. When an intractable polymer is tested, the compliance will increase strictly monotonically and to a much lesser extent with increasing temperature than when a tractable specimen is tested.

Representative intractable polymers for use in the process include the polymers of the BBB type [i.e. polybisbenzimidazobenzophenanthroline and related nitrogeneous polymers]. Such BBB type polymers may be of either of the semi-ladder (i.e. have a combination of cyclic and non-cyclic C—C single bonds in the polymer chain) or ladder (i.e. have an entirely cyclic structure with no C—C single bond as the sole link in the polymer chain) variety. The latter polymer variety sometimes is identified as a BBL polymer. Other intractable ladder polymers, such as the polypyrrolones, which contain anthraquinone units may be employed. See, for instance, the discussion of such polymers by P. K. Dutt and C. S. Marvel in "Polymers Containing Antraquinone and Quinoxaline Units: Polypyrrolones", J. Polymer Science, Pt. A–1, vol. 8, No. 11, pp. 3225 (1971).

As is now otherwise known in the art, BBB type polymers may be formed by condensing at least one organic tetra-amine with at least one tetracarboxylic acid (which also may be in the form of the corresponding half anhydride or dianhydride).

The organic tetra-amine reactant may have the structural formula

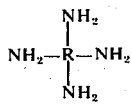

wherein R is an aromatic or cycloaliphatic tetravalent radical and wherein each of the four amino groups is attached directly to a carbon atom present in a ring of said aromatic or cycloaliphatic radical in a position which is ortho or peri to another carbon atom to which another of said amino groups is also directly attached. When R is an amino substituted bicyclic ring compound, such as tetra-amino substituted naphthalene, the carbon atoms at the 1 and 8 positions are considered to be peri to each other as are the carbon atoms at the 4 and 5 positions. Five or six member rings are formed depending upon whether R is ortho or peri amino substituted respectively, as will be apparent to those skilled in the art. It is preferred that R be an aromatic radical rather than a cycloaliphatic radical. It is preferred that R contain up to about 20 carbon atoms.

Non-limiting examples of the tetra-amine monomers which may be used individually or in mutual admixture when forming the BBB type polymers are: 3,3'-diaminobenzidine; bis(3,4-diamino phenyl) methane; 1,2-bis(3,4-diamino phenyl) ethane; 2,2-bis(3,4-diamino phenyl) propane; bis(3,3-diamino phenyl) ether; bis(3,4-diamino phenyl) sulfide; bis(3,4-diamino phenyl) sulfone; 1,2,4,5-tetra-amino benzene; 1,4,5,8-tetra-amino-naphthalene; 2,3,6,7-tetra-aminonaphthalene; etc; and the corresponding ring hydrogenated tetra-amines.

The tetracarboxylic acid reactant (which also may be in the form of the corresponding half anhydride or dianhydride) may have the structural formula

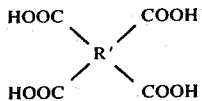

wherein R' is a tetravalent aromatic or cycloaliphatic radical wherein each of the four carboxyl groups is attached directly to a carbon atom present in a ring of said aromatic or cycloaliphatic radical in a position which is ortho or peri to another carbon atom to which another of said carboxyl groups is also directly attached. When R' is a carboxyl substituted bicyclic fused ring compound such as tetra-carboxyl naphthalene, the carbon atoms at the 1 and 8 positions are considered to be peri to each other, as are the carbon atoms at the 4 to 5 positions. Five or six member rings are formed depending upon whether R' is ortho or peri carboxyl substituted respectively, as will be apparent to those skilled in the art. It is preferred that R' be an aromatic radical rather than a cycloaliphatic radical. It is preferred that R' contain up to about 20 carbon atoms.

Non-limiting examples of the tetracarboxylic acids which may be used in forming the BBB type polymers include; pyromellitic acid, i.e. 1,2,4,5-benzenetetracarboxylic acid; 2,3,6,7-naphthalene tetracarboxylic acid; 3,3',4,4'-diphenyl tetracarboxylic acid; 1,4,5,8-naphthalene tetracarboxylic acid; 2,2',3,3'-diphenyl tetracarboxylic acid; 2,2-bis(3,4-dicarboxyphenyl) propane; bis(3,4-dicarboxyphenyl) sulfone; 3,4,9,10-perylene tetracarboxylic acid; bis(3,4-dicarboxyphenyl)ether; ethylene tetracarboxylic acid; naphthalene-1,2,4,5-tetracarboxylic acid; decahydronaphthalene-1,4,5,8-tetracarboxylic acid; 4,8-dimethyl-1,2,3,5,6-hexahydronaphthalene-1,2,5,6-tetracarboxylic acid; 2,6-dichloronaphthalene-1,4,5,8-tetracarboxylic acid; 2,7-dichloronaphthalene-1,4,5,8-tetracarboxylic acid; 2,3,6,7-tetrachloronaphthalene-1,4,5,8-tetracarboxylic acid; phenanthrene-1,8,9,10-tetracarboxylic acid; cyclopentane-1,2,3,4-tetracarboxylic acid; pyrrolidine-2,3,4,5-tetracarboxylic acid; pyrazine-2,3,5,6-tetracarboxylic acid; 2,2-bis(2,3-dicarboxyphenyl)-propane;1,1-bis(3,4-dicarboxyphenyl) ethane; bis(2,3-dicarboxyphenyl) methane; bis(3,4-dicarboxyphenyl) methane; benzene-1,2,3,4-tetracarboxylic acid; 1,2,3,4-butane tetracarboxylic acid; thiophene-2,3,4,5-tetracarboxylic acid; and similar acids, as well as the half anhydrides (i.e. mono anhydrides) or dianhydrides of such acids. The preferred tetracarboxylic acids contain carboxyl groups peri substituted upon a naphthalene nucleus.

The intractable BBB type polymers may be formed in accordance with known techniques, and commonly exhibit an inherent viscosity of at least 0.5 dl./gram (e.g. 0.8 to 4.0 dl.gram). The inherent viscosity may be measured at 25°C. at a concentration of 0.4 g. of polymer per 100 ml. of solvent. Ninety-seven percent sulfuric acid (by weight) is a convenient and preferred solvent for the purpose of this invention though other solvents may be used similarly. The viscosity of the polymer solution is measured relative to that of the solvent alone and the inherent viscosity (I.V.) is determined from the following equation:

$$I.V. = \frac{\ln \frac{V_2}{V_1}}{C}$$

In the above formula, $V_2$ is the efflux time of the solution, $V_1$ is the efflux time of the solvent, and C is the concentration expressed in grams of polymer per 100 ml. of solution. As is known in the polymer art, inherent viscosity is monotonically related to the molecular weight of the polymer. Representative techniques for forming the BBB type polymers are disclosed in commonly assigned U.S. Pat. Nos. 3,539,677; 3,574,170; 3,574,171; and 3,792,024; and Ser. Nos. 229,178, filed Feb. 24, 1972; 221,780, filed Jan. 28, 1972; 229,178, filed Feb. 24, 1972; and 424,996, filed Dec. 14, 1973, which herein are incorporated by reference.

THE CROSS-LINKABLE ADDITIVE POLYMER

The cross-linkable additive polymer selected for use in the present process unlike the intractable high temperature polymer exhibits a recognizable glass transition temperature below its decomposition temperature. More specifically, when the solid additive polymer is subjected to thermomechanical analysis, a sharp increase of both the thermal expansion and the elastic shear compliance takes place at the glass transition temperature, Tg, upon heat-up of test specimen. Such glass transition temperature preferably should occur at temperatures above 200°C. and most preferably at a temperature above 250°C. The additive polymer is cross-linkable in the sense that upon exposure to heat (e.g. at approximately the glass transition temperature) its polymeric chains start forming primary bonds to their neighboring chains (i.e. cross-linking occurs). When cross-linking occurs the stiffness of the bonded chain assembly increases, and chain mobility decreases greatly, thereby causing a gradual disappearance of the original Tg. Particularly effective cross-linking atoms are oxygen and nitrogen both of which tend to act as "bridge" atoms to effect the cross-linking provided the temperature is high enough to initiate the same by increasing chain mobility to the point at which the reactive sites began to interact.

Representative cross-linkable additive polymers for use in the process include the polybenzimidazoles, polyquinoxalines, polybenzothiazoles, polybenzoxazoles, polyoxadiazoles, and mixtures thereof. Homopolymers or copolymers of such cross-linkable additive polymers may be selected. Alternatively, precursors capable of forming the same during subsequent processing initially may be selected and admixed.

The cross-linkable additive polymers may be formed by techniques known in the art. For instance, polybenzimidazoles may be preformed in accordance with the teachings of U.S. Pat. Nos. 2,895,948; 3,174,947; 3,433,772; 3,509,108; and 3,549,603 which are herein incorporated by reference.

The polybenzimidazoles commonly include recurring units of the formula:

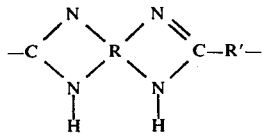

wherein R is a symmetrically tetravalent aromatic nucleus, the adjacent carbon atoms of which pair with nitrogen atoms to form the benzimidazole rings, and R' is an aromatic or alicyclic ring, an alkylene group or a heterocyclic ring. Examples of such heterocyclic rings include those of pyridine, pyrazine, furan, quinoline, thiophene and pyran. Preferred R groups are diphenyl with free valences at the 3,3',4, and 4' positions, i.e.,

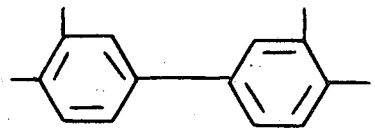

benzene with free valences at the 1,2,4, and 5 positions, i.e.,

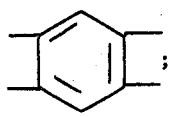

and

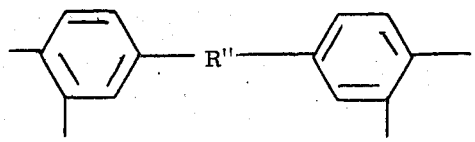

wherein R'' is

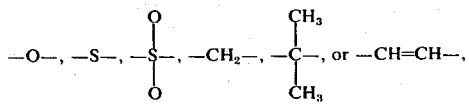

Examples of such polybenzimidazoles include poly-2,2'(m-phenylene) 5,5'-bibenzimidazole; poly-2,2'-(pyridylene-3'',5'')-5,5'-bibenzimidazole; poly-2,2'-(furylene-2'',5'')-5,5'-bibenzimidazole; poly- 2,2'-(naphthalene-1'',6'')-5,5'-bibenzimidazole;poly-2,2'-(biphenylene-4'',4'')-5,5'-bibenzimidazole; poly-2,2'-octamethylene-5,5'-bibenzimidazole; poly-2,6-(m-phenylene)-diimidazobenzene; poly-2,2'-cyclohexenyl-5,5'-bibenzimidazole; poly-2,2'(m-phenylene)-5,5'-di(benzimidazole) ether; poly-2,2'-(m-phenylene)-5,5'-di(benzimidazole) sulfide; poly-2,2'(m-phenylene)-5,5'-di(benzimidazole) sulfone; poly-2,2'(m-phenylene)-5,5'-di(benzimidazole) methane; poly-2',2''(m-phenylene)-5',5'' di(benzimidazole) propane-2,2, and poly-2',2''-(m-phenylene)-5',5'' di(-benzimidazole) ethylene-1,2 where the double bonds of the ethylene groups are intact in the final polymer. The particularly preferred polybenzimidazole for use in the process is poly-2,2'(m-phenylene)5,5'-bibenzimidazole. Preformed polybenzimidazoles preferably have an inherent viscosity of at least 0.5 dl./gram, and most preferably about 0.6 to 1.0 dl./gram.

As discussed in U.S. Pat. No. 3,174,947 polybenzimidazoles may be prepared by reacting a member of the class consisting (A) an aromatic compound containing ortho disposed diamino substituents and an aromatic carboxylate ester substituent and (B) a mixture of (1) an aromatic compound containing a pair of ortho-diamino substituents on the aromatic nucleus and (2) a member of the class consisting of (a) the diphenyl ester of an aromatic dicarboxylic acid and, (b) the diphenyl ester of a heterocyclic dicarboxylic acid wherein the carboxyl groups are substituents upon carbon in a ring compound from the class consisting of pyridine, pyrazine, furan and quinoline and (c) an anhydride of an aromatic dicarboxylic acid. The "aromatic compound" mentioned in the foregoing description of (A) and (B) may contain a single aromatic ring structure of a plurality of such ring structures, e.g. two such structures separated by an ether, sulfide, sulfone, alkylidene or alkylene group to yield the foregoing polymer structures.

The polyquinoxalines may be prepared from bis-o-diamines and bisglyoxalyls in accordance with techniques reported by G. P. de Gaudemaris and B. J. Sillion in "New Polymers Obtained by Polyheterocyclization: Polyquinoxalines", J. Polymer Sci., part B, vol. 2, pp. 203–207, and J. K. Stille and J. R. Williamson, "Polyquinoxalines", J. Polymer Sci., part B, vol. 2, p. 209.

The polybenzothiazoles may be prepared from 3,3'-dimercaptobenzidine and the diacid, diphenyl ester, diacid chloride, etc. (e.g. diphenyl isophthalate). See "Polybenzothiazoles, I: Synthesis and Preliminary Stability Evaluation", by P. M. Hergenrother, W. Wrasidlo, and H. H. Levine, J. Polymer Sci., part A, vol. 3, pp. 1665–1674 (1965).

The polybenzoxazoles are similar to the polybenzothiazoles except that the sulfur atoms of the latter molecules are replaced by oxygen molecules. The preparation of the polybenzoxazoles is therefore analogous to that of the polybenzothiazoles. The polybenzoxazoles may be prepared by the reaction of 4,4'-dihydroxy-m-benzidine, and an aromatic diacid, its ester, or the diacid chloride (e.g. isophthaloyl chloride).

The polyoxadiazoles may be prepared by heating polyhydrazides or by the reaction of a bistetrazole (e.g. p-phenylene-5,5'-tetrazole) and an aromatic diacid chloride (e.g. isophthaloyl chloride) as described for instance by C. J. Abshire and C. S. Marvel in "Some Oxadiazole Triazole Polymers", Macromol. Chem., Vol. 44–46, pp. 388–397 (1961).

The Formation of Three-Dimensional Shaped Articles

A substantially uniform admixture of a major quantity of the intractable high temperature resistant polymer and a minor quantity of the cross-linkable additive polymer (or precursors capable of forming the same) is provided. The desired uniform admixture advantageously may be achieved through the provision of the blend components in finely divided form as well as physical mixing. Suitable comminution procedures include precipitation and/or grinding. Representative grinding procedures such as jet milling, impact mix-milling, wet or dry ball milling, etc. may be employed. A preferred polymerization procedure wherein intractable BBB type polymer may be recovered in a finely divided form of unusually high surface area is disclosed in Ser. No. 424,996, filed Dec. 14, 1973, of Anthony B. Conciatori and Rufus S. Jones, Jr. The particle size of the components of the admixture preferably is less than 10 micrometers when present in the admixture. Suitable mixing procedures for blending the finely divided polymeric components include the utilization of impact milling/mixing (e.g. a Spex Micromixer Mill), jet milling (e.g. a Sturtevant Micronizer Mill), etc. Alternatively, a solution containing each component dissolved therein may be blended together and simultaneously contacted with a non-solvent to coprecipitate each component of the admixture in a co-mingled particulate form.

In a preferred embodiment of the invention the resulting admixture comprises about 70 to 95 parts by weight (e.g. 80 to 90 parts by weight) of the intractable high temperature resistant polymer and 5 to 30 parts by weight (e.g. 10 to 20 parts by weight) of the cross-linkable additive polymer.

In a particularly preferred embodiment of the process the cross-linkable additive polymer exhibits a smaller particle size than the intractable high temperature resistant polymer thus facilitating optimum distribution within the admixture and more efficient interaction during the subsequent shaped article formation step.

One may optionally include within the admixture fillers and/or reinforcing media. Representative fillers include asbestos, wool, carbon black, wollastonite, alumina, etc. Representative reinforcing media include fibers of BBB type polymer, graphite or carbon fibers, aromatic polyamide fibers, chopped fiberglass, etc. Such fillers or reinforcing media commonly may be provided in a total concentration of up to about 50 percent by weight (e.g. in about 30 to 40 percent by weight) based upon the total weight of the intractable high temperature resistant polymer and cross-linkable additive polymer components. A coupling agent may be provided upon fillers and/or reinforcing media to enhance the bond with the polymer matrix.

The substantially uniform admixture next is formed into a three-dimensional shaped article at a temperature which is below the decomposition temperature of the intractable high temperature resistant polymer, and below the decomposition temperature of the cross-linkable additive polymer. in a preferred embodiment of the process the shaped article is formed at a temperature which is within 60°C. of the glass transition temperature of the cross-linkable additive polymer, and most preferably at a temperature which approximates that of the glass transition temperature of the cross-linkable additive polymer. Pressure molding techniques are preferably employed. For instance, when the intractable high temperature resistant polymer is a BBB type polymer in a quantity of about 70 to 95 parts by weight and the cross-linkable additive polymer is a polybenzimidazole in a quantity of about 5 to 30 parts by weight, a molding temperature of about 350° to 450°C. and a mold pressure of about 5,000 psi to 50,000 psi may be employed. With the higher molding temperatures the pressure may be decreased accordingly without affecting the final properties of the shaped article. A representative apparatus for the formation of such shaped articles is a high temperature, controlled ambient hot press, such as manufactured by Astro Industries, Santa Barbara, Calif. or Autoclave Engineers, Erie, Pa.

The substantially uniform admixture prior to molding initially may be consolidated by cold pressing at room temperature to provide a less bulky sample. A good quality steel alloy matched die mold may be used to withstand the action of potentially corrosive off-gases and the high pressure at elevated temperature. The admixture may be cold pressed in the die mold while in the press. After cold pressing, the sample chamber may be closed vacuum tight, pressure applied, and the mold heated up to the ultimate molding temperature.

The resulting shaped article is heated until the cross-linkable additive polymer component of the admixture is cross-linked and the thermal stability of the shaped article enhanced. Such cross-linking conveniently may be carried out by maintaining the shaped article in the pressure mold for an additional period of time during which the desired cross-linking is accomplished. For instance, when the cross-linkable additive polymer is a polybenzimidazole, a fully cross-linked product commonly is formed within about 5 to 60 minutes while at a mold temperature of about 350° to 450°C. as previously discussed. In a preferred embodiment of the process the shaped article is formed and the additive polymer is cross-linked while present in a non-oxidizing atmosphere, e.g. while under a vacuum or in the presence of a gaseous atmosphere such as nitrogen, argon, or helium, or mixtures thereof. During the cross-linking reaction the usual glass transition temperature of the additive polymer gradually is eliminated so that the thermal and mechanical properties of the shaped article are enhanced.

Alternatively, the cross-linking may be conducted outside the mold. For instance, the shaped article following its formation may be removed from the mold following pressing and reheated without pressure to accomplish the desired cross-linking.

The process of the present invention enables the facile molding of three-dimensional shaped articles from intractable high temperature resistant polymers to produce a fully fused, coherent product which cannot be obtained when using the intractable polymer alone. The theory whereby the cross-linkable additive polymer is capable of facilitating molding to form an improved monolithic article is considered to be complex and incapable of simple explanation. It is believed tht the results achieved are attributable to interaction involving several physicochemical mechanisms between the two types of polymers in the grain boundary region. The plastic deformation of the finely distributed additive polymer component may cause plasticization of the grain boundaries of the heated specimen in which solid state diffusion of oligomers and/or intermingling of the two types of polymer chains takes place. Not only is good compaction accomplished within the shaped article, but enhanced polymer bonding is achieved without any substantial loss of thermal stability. The physical properties such as the tensile, compressive, and shear strengths and moduli, specimen density, high temperature creep and corrosion resistances of the resulting shaped article are improved. For instance, high temperature resistant pressure molded three-dimensional shaped articles having a flexural strength of at least 5,000 psi may be formed.

The shaped articles formed in accordance with the present invention are capable of utilization in high temperature environments (e.g. 300°C. and above) and may be provided in a variety of simple or complx shapes. For instance, structural components, such as shells, domes, membranes (structural or otherwise), cellular structures, plates, shaped beams, may be formed by use of a suitably large molding press or autoclave. The shaped articles are capable of long-term service in an environment in which a lightweight structure is required to withstand stresses at elevated temperatures or in a corrosive environment. Metal alloys which are commonly being used at the present time are often sensitive to corrosion by hot wet gases (e.g. ammonia or hydrogen) or hot chemical liquids (e.g. acids, alkalis, or solvents) whereas the shaped articles of the present invention are highly resistant to simultaneous corrosion and heat under many service conditions.

The following examples are given as specific illustrations of the invention. It should be understood, however, that the invention is not limited to the specific details set forth in the examples. The intractable high temperature polymer utilized in each example is poly(-bisbenzimidazobenzophenanthroline) having an inherent viscosity of 2.4 dl./gram formed by the condensation of 1,4,5,8-naphthalene tetracarboxylic acid and 3,3'-diamino benzidine to form a semi-ladder polymer one isomer of which is illustrated in the following equation:

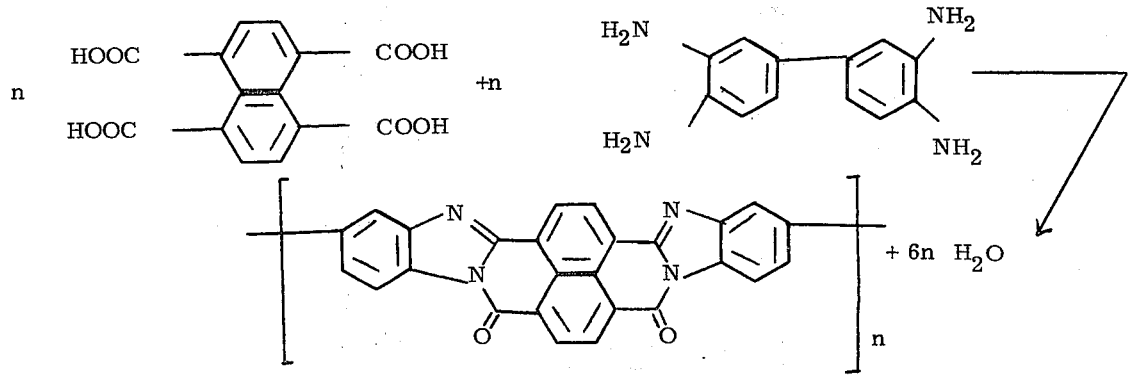

The specific isomer illustrated may be identified as poly[6,9-dihydro-6,9-dioxobisbenzimidazo(2,1-b:1',-2'-j)benzo(lmn) (3,8) phenanthroline-2,13-diyl]. It will be apparent to those skilled in the art that various additional isomers will also be produced during the condensation reaction.

EXAMPLE I

Twenty parts by weight of preformed poly 2,2'(m-phenylene) 5,5'-bibenzimidazole polymer are provided in admixture with eighty parts by weight of the intractable polybenzimidazobenzophenanthroline. The later polymer lacks a glass transition temperature below its decomposition temperature of about 650°C. The former polymer exhibits an initial glass transition temperature of about 370°C. and an inherent viscosity of 0.72 dl./gram.

The admixture of the polymers is accomplished via coprecipitation wherein solid particles of each polymer are provided in a co-mingled form. More specifically, the polymers are dissolved in 97% aqueous sulfuric acid in the ratio indicated in a total concentration of 10 grams of polymer in 500 grams of the $H_2SO_4$ and coprecipitated by adding this solution to a liquid mixture of 50—50 weight percent of aqueous $H_2SO_4$ in an overall dilution ratio of 1:10 by volume. The latter solution is added slowly to a ten times larger volume of deionized water which is agitated by a high shear mixer. As a result the polymers precipitate slowly and progressively as thoroughly blended fine particles. The precipitate is collected on a filter and is dried in a vacuum oven at approximately 80°C. for 2 hours. The average particle size of components of the admixture is about 2 to 3 micrometers.

The dry admixture is placed in a cylindrical piston type steel die having an inner opening of one inch in diameter. The particulate admixture is first compacted at room temperature at 50,000 psi pressure. The sample chamber is closed vacuum tight and evacuated to rough vacuum during the hot molding cycle. A ram pressure of 20,000 psi is applied and the sample progressively is heated to 400°C. at a rate of about 10°C./minute and the shaped article is formed. After reaching 400°C., that temperature is held for 15 minutes to cross-link the additive polymer. Thereafter, the heater is shut-off and the mold cooled by a nitrogen gas purge to about 125°C. at which time the pressure is removed, the mold removed, and the specimen ejected from the warm die. The cooling time is about 30 minutes.

The resulting shaped article evidences a bulk density of 1.40 g./cm.$^3$. Several small beams are cut from the disc and when tested in three-point flexure show a mean flexural strength of 6,600 psi, and a mean flexural modulus of 680,000 psi.

In a comparative example the poly 2,2′(m-phenylene)5,5′-bibenzimidazole is omitted and solely the particles of the polybisbenzimidazobenzophenanthroline polymer are molded under the identical conditions. It is observed that the resulting molded article is inferior in that the specimen is extremely weak and crumbles upon removal from the mold indicating very little coherence among the pressed particles even though the specimen density is 1.38 g./cm.$^3$ indicating good initial compaction. Because of the disintegration the flexural properties of the specimen could not be measured.

EXAMPLE II

Example I is repeated with the exception that monomeric precursors for the cross-linkable additive polymer are admixed with the polybisbenzimidazo-benzophenanthroline polymer rather than utilizing preformed poly 2,2′(m-phenylene)5,5′-bibenzimidazole polymer. More specifically, 10 parts by weight 3,3′-diaminobenzidine, and 10 parts by weight 1,4,5,8-naphthalene tetracarboxylic acid anhydride are admixed with 80 parts by weight of the polybisbenzimidazobenzophenanthroline. Initially the monomer particles are comminuted by milling them together in a Spex Mixer-Mill for 30 minutes, after which the BBB powder is added and comminution is continued for another 30 minutes.

The mixture following drying is molded into a disc at 50,000 psi as described in Example I, and pressure molded at 50,000 psi. While present in the mold the polybenzimidazole polymer is formed and becomes cross-linked. The specimen density is 1.42 g./cm.$^3$, the mean flexural strength 5,500 psi, and the mean flexural modulus 560,000 psi. The thermal stability of the BBB/PBI article estimated from the TMA curves utilizing a DuPont Thermogravimetric Analyzer Model 950 at a heating rate of 10°C. per minute is 640°C. vs. 650°C. for the neat BBB.

EXAMPLE III

Example I is repeated with the exception that polyquinoxaline polymer possessing an inherent viscosity of 0.8 dl./gram and a glass transition temperature of about 280°C. is substituted for the poly 2,2′(m-phenylene)5,5′-bibenzimidazole polymer. The polyquinoxaline possesses recurring units of the following structural formula:

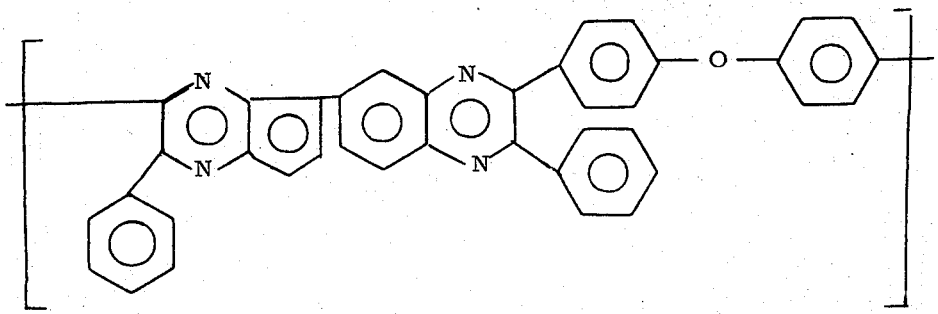

Five parts by weight of the polyquinoxaline are admixed with 95 parts by weight of the BBB type polymer. Each component is initially comminuted separately for 30 minutes in a Spex Mixer-Mill and then together for 30 minutes. A disc sample is cold pressed in a piston mold at 16,000 psi for 10 minutes. The mold is then heated up in vacuum at 5,000 psi pressure at a rate of 10°C. per minute to 300°C. to form the shaped article, and is held at 300°C. for 10 minutes to accomplish cross-linking before cooling down as described.

The resulting specimen exhibits a bulk density of 1.56 g./cm.$^3$, and a mean flexural strength of 6,000 psi.

EXAMPLE IV

Example I is repeated with the exceptions indicated. The BBB and PBI powders first are comminuted separately by impact crushing in a Spex "shatterbox" for 5 minutes each. They are then mixed together in a Spex Mixer-Mill for 30 minutes. After consolidation by cold pressing at 20,000 psi for 20 minutes in the steel piston mold, the sample is heated in an Astro hot press to 400°C. at approximately 8°C. per minute in dry nitrogen to form a shaped article. After heating at 400°C. for 30 minutes in nitrogen to cross-link the specimen the resulting specimen is cooled to 100°C. and is removed from the press and the mold. The density of the article is found to be 1.38 grams per cubic centimeter, and the mean flexural strength of a small test specimen cut from the disc is 5,700 psi, and the mean flexural modulus is 650,000 psi. The thermal stability of the 80/20 BBB/PBI article estimated from the TMA curves is nearly the same as that of the neat BBB polymer, i.e. 625°C. for the alloy BBB versus 650°C. for the neat BBB.

Although the invention has been described with preferred embodiments, it is to be understood that variation and modifications may be resorted to as will be apparent to those skilled in the art. Such variations and modifications are to be considered within the purview and scope of the claims appended hereto.

We claim:
1. An improved process for forming a three-dimensional shaped article from a normally intractable high temperature resistant polymer comprising:
   a. physically admixing in substantially uniform admixture (1) a major quantity of a nitrogenous intractable high temperature resistant polymer which lacks a glass transition temperature below its decomposition temperature and (2) a minor quantity of a cross-linkable additive polymer exhibiting a glass transition temperature above 200°C. and below its decomposition temperature, or precursors capable of forming the same,
   b. forming said substantially uniform admixture into a three-dimensional shaped article at a temperature which is below the decomposition temperature of said intractable high temperature resistant polymer, and below the decomposition temperature of said cross-linkable additive polymer, and
   c. heating said resulting shaped article until said cross-linkable additive polymer is cross-linked and the thermal stability of said shaped article enhanced.

2. An improved process in accordance with claim 1 wherein said nitrogenous intractable high temperature resistant polymer which lacks a glass transition temperature below its decomposition temperature is a condensation product of at least one organic tetra-amine with at least one tetra-carboxylic acid or the corresponding anhydride.

3. An improved process in accordance with claim 1 wherein said cross-linkable additive polymer prior to said step (c) exhibits a glass transition temperature above 250°C.

4. An improved process in accordance with claim 1 wherein said cross-linkable additive polymer is selected from the group consisting of polybenzimidazoles, polyquinoxalines, polybenzothiazoles, polybenzoxazoles, polyoxadiazoles, and mixtures thereof.

5. An improved process in accordance with claim 1 wherein said substantially uniform admixture of step (a) comprises (1) about 70 to 95 parts by weight of said intractable polymer and (2) about 5 to 30 parts by weight of said cross-linkable additive polymer.

6. An improved process in accordance with claim 1 wherein said step (b) is carried out via pressure molding.

7. An improved process in accordance with claim 1 wherein said steps (b) and (c) are carried out in a non-oxidizing atmosphere.

8. An improved process for forming a three-dimensional shaped article from a normally intractable high temperature resistant polymer comprising:
   a. physically admixing in substantially uniform admixture (1) about 70 to 95 parts by weight of an intractable high temperature resistant polymer which is a condensation product of at least one organic tetra-amine with at least one tetra-carboxylic acid or the corresponding anhydride and lacks a glass transition temperature below its decomposition temperature and (2) about 5 to 30 parts by weight of a cross-linkable additive polymer exhibiting a glass transition temperature above 200°C. and below its decomposition temperature, or precursors capable of forming the same,
   b. forming said substantially uniform admixture into a three-dimensional shaped article at a temperature which is within 60°C. of the glass transition temperature of said cross-linkable additive polymer and which is below the decomposition temperature of said intractable high temperature resistant polymer, and below the decomposition temperature of said cross-linkable additive polymer, and
   c. heating said resulting shaped article until cross-linkable additive polymer is cross-linked and the thermal stability of said shaped article enhanced.

9. An improved process in accordance with claim 8 wherein said cross-linkable additive polymer prior to step (c) exhibits a glass transition temperature above 250°C.

10. An improved process in accordance with claim 8 where said cross-linkable additive polymer is selected from the group consisting of polybenzimidazoles, polyquinoxalines, polybenzothiazoles, polybenzoxazoles, polyoxadiazoles, and mixtures thereof.

11. An improved process in accordance with claim 8 wherein said substantially uniform admixture of step (a) comprises (1) about 80 to 90 parts by weight of said intractable polymer and (2) about 10 to 20 parts by weight of said cross-linkable additive polymer.

12. An improved process in accordance with claim 8 wherein said step (b) is carried out via pressure molding.

13. An improved process in accordance with claim 8 wherein said steps (b) and (c) are carried out in a non-oxidizing atmosphere.

14. An improved process for forming a three-dimensional shaped article from a normally intractable high temperature resistant polymer comprising:
   a. physically admixing in substantially uniform admixture (1) about 70 to 95 parts by weight of an intractable high temperature resistant polymer which is a condensation product of at least one organic tetra-amine with at least one tetra-carboxylic acid or the corresponding anhydride, and (2) about 5 to 30 parts by weight of a polybenzimidazole,
   b. pressure molding said substantially uniform admixture at a temperature of about 350° to 450°C. and a pressure of about 5,000 to 50,000 psi to form a three-dimensional shaped article, and
   c. heating said resulting shaped article at a temperature of about 350° to 450°C. until said polybenzimidazole is cross-linked and the thermal stability of said shaped article is enhanced.

15. An improved process in accordance with claim 14 wherein said substantially uniform admixture of step (a) comprises (1) about 80 to 90 parts by weight of said intractable high temperature resistant polymer and (2) about 10 to 20 parts by weight of said polybenzimidazole.

16. An improved process in accordance with claim 14 wherein said polybenzimidazole is poly 2,2'(m-phenylene)5,5'-bibenzimidazole.

17. An improved process in accordance with claim 14 wherein said steps (b) and (c) are carried out in a non-oxidizing atmosphere.

18. An improved process in accordance with claim 17 wherein said non-oxidizing atmosphere is a vacuum or is selected from the group consisting essentially of nitrogen, argon, helium, and mixtures thereof.

19. A high temperature resistant pressure molded three-dimensional shaped article having a flexural strength of at least 5,000 psi comprising in substantially uniform admixture (1) about 70 to 95 parts by weight of a nitrogenous intractable high temperature resistant polymer which lacks a glass transition temperature below its decomposition temperature and (2) about 5 to 30 parts by weight of a cross-linked additive polymer exhibiting a glass transition temperature above 200°C.

20. A high temperature resistant pressure molded three-dimensional shaped article in accordance with claim 19 wherein said cross-linked additive polymer is selected from the group consisting of polybenzimidazoles, polyquinoxalines, polybenzothiazoles, polybenzoxazoles, polyoxadiazoles, and mixtures thereof.

* * * * *